United States Patent
Düser et al.

(10) Patent No.: US 11,136,127 B2
(45) Date of Patent: Oct. 5, 2021

(54) SUPERVISION SYSTEM FOR AN AIRCRAFT FOR MONITORING THE SAFE CHARGING OF PORTABLE ELECTRICAL DEVICES

(71) Applicant: Airbus Operations GmbH, Hamburg (DE)

(72) Inventors: Gerd Düser, Hamburg (DE); Christian Schaupmann, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 0 days.

(21) Appl. No.: 16/718,741

(22) Filed: Dec. 18, 2019

(65) Prior Publication Data

US 2020/0198788 A1   Jun. 25, 2020

(30) Foreign Application Priority Data

Dec. 20, 2018  (DE) .......................... 102018133175.4

(51) Int. Cl.
    *B64D 11/06* (2006.01)
    *B60N 2/00* (2006.01)
    *B64D 11/00* (2006.01)

(52) U.S. Cl.
    CPC .......... *B64D 11/0624* (2014.12); *B60N 2/002* (2013.01); *B64D 11/00151* (2014.12); *B64D 11/00155* (2014.12)

(58) Field of Classification Search
    CPC .......... B64D 11/0624; B64D 11/00151; B64D 11/00155; B60N 2/002
    See application file for complete search history.

(56) References Cited

U.S. PATENT DOCUMENTS

| 6,929,218 B1 | 8/2005 | Sanford et al. |
| 7,878,586 B2 * | 2/2011 | Kneller ................. B64D 11/00 297/217.6 |

(Continued)

FOREIGN PATENT DOCUMENTS

| EP | 2842871 A1 | 3/2015 |
| WO | 2005030523 A1 | 4/2005 |
| WO | 2017176748 A1 | 10/2017 |

OTHER PUBLICATIONS

German Search Report; priority document.

*Primary Examiner* — Philip F Gabler
(74) *Attorney, Agent, or Firm* — Greer, Burns & Crain, Ltd.

(57) ABSTRACT

A supervision system for an aircraft for monitoring a safe charging of portable electrical devices of a passenger who may be in an attentive or an inattentive state, comprising a passenger seat, a power supply station assigned to the seat and used to supply electrical power to the portable electrical device, the portable electrical device being connected to the power supply station, a camera, which detects the state of the passenger situated on the seat, and an arrangement to distinguish whether the passenger is in an attentive or inattentive state. A method for safe charging of portable electrical devices is also presented and described, comprising the steps of detecting a passenger with a camera, analyzing whether the passenger is in an attentive state or in an inattentive state, and, if the passenger is in an attentive state, supplying a power supply station with electrical power to be provided to a portable electrical device connected to the power supply station.

9 Claims, 2 Drawing Sheets

(56) References Cited

U.S. PATENT DOCUMENTS

| | | | | |
|---|---|---|---|---|
| 8,892,792 | B2* | 11/2014 | Royster | B64D 11/0624 |
| | | | | 710/36 |
| 9,302,781 | B2 | 4/2016 | Jouper et al. | |
| 9,751,534 | B2* | 9/2017 | Fung | G16H 50/20 |
| 9,852,355 | B2* | 12/2017 | Couleaud | G06K 9/2027 |
| 10,881,357 | B1* | 1/2021 | Watson | A61B 5/02055 |
| 2005/0080533 | A1* | 4/2005 | Basir | B60N 2/002 |
| | | | | 701/45 |
| 2013/0063340 | A1* | 3/2013 | Mondragon | G06F 1/1605 |
| | | | | 345/156 |
| 2017/0283086 | A1* | 10/2017 | Garing | B64D 45/0005 |
| 2018/0136733 | A1* | 5/2018 | Schalla | B64D 13/00 |
| 2019/0391581 | A1* | 12/2019 | Vardaro | A61B 5/18 |

* cited by examiner

SUPERVISION SYSTEM FOR AN AIRCRAFT FOR MONITORING THE SAFE CHARGING OF PORTABLE ELECTRICAL DEVICES

CROSS-REFERENCES TO RELATED APPLICATIONS

This application claims the benefit of the German patent application No. 102018133175.4 filed on Dec. 20, 2018, the entire disclosures of which are incorporated herein by way of reference.

FIELD OF THE INVENTION

The present invention relates to a supervision system for an aircraft for monitoring the safe charging of portable electrical devices, to a method for safe charging of portable electrical devices, and to an aircraft comprising the system.

BACKGROUND OF THE INVENTION

With regard to outlets in operation on board an aircraft, the European Organization for Civil Aviation Equipment (EUROCAE) stipulates that "Indication should be provided to enable cabin crew to detect which outlets are in use." Indication of this type in a costly and high-maintenance solution currently in common use involves what are known as indication lights, which are installed on the aisle side of the seating group, and are wired in the seat to the power supply unit at the expense of time and money. This wiring in turn has a negative impact on the total weight and hence on the operating costs of an aircraft. In addition, it takes time for the cabin crew to perform the associated visual check of whether an outlet is in use (or rather whether the indication light is on). In particular, an indicator of this type also does not state whether the connected technical device, for instance a cellphone, or a tablet, or in general a portable personal electronic device (PED), is still in a thermally non-critical state. It is known that overheated rechargeable batteries can lead to an increased fire risk in the aircraft cabin.

SUMMARY OF THE INVENTION

It is, hence, an object of the present invention to facilitate rapid and simple checking of outlets located on board an aircraft without, however, introducing any significant additional weight on board an aircraft. Moreover, it is also an object of the present invention to facilitate a thermal check of a PED connected to such an outlet.

The present supervision system for an aircraft for monitoring the safe charging of portable electrical devices comprises a passenger. The passenger may be an ordinary passenger. In principle, however, since the cabin crew are using mobile devices increasingly frequently as well, it is also conceivable that the passenger under supervision may be a member of the crew. This passenger is in an attentive state (i.e., he is in his seat position and is awake) or in an inattentive state, i.e., he is currently not in his seat position, has fallen asleep, or, for example, is resting with eyes closed. The supervision system also comprises a seat for the passenger. Such seats are arranged in an aircraft cabin usually one behind the other in seat rows. In addition, according to the invention, the seat is assigned a power supply station, which can be used to supply electrical power to a portable electrical device. For example, this supply of power can be made via a Universal Serial Bus (USB) or even wirelessly by means of induction, e.g., via Bluetooth or near-field communication (NFC) or radio frequency identification (RFID) technology.

The supervision system also comprises a portable electrical device, which is connected to the power supply station, a camera, which detects the state of a passenger situated on the seat, and means for distinguishing whether a passenger is in an attentive or inattentive state. These distinguishing means are preferably image processing software. Alternatively or additionally, however, sensors located in the seat are also conceivable, which sense the weight present on the seat, or sense the presence of a passenger by means of a temperature measurement. A technical solution of this type has the advantage that it makes use of pre-installed hardware. For example, the camera may be contained in a backrest monitor. This avoids any additional wiring.

In an embodiment according to the invention, the portable electrical device is in a state that for the camera is visually or thermally detectable or in a state that is not visually or thermally detectable. This means that the camera additionally acquires a standard visual image or a thermal image of the portable electrical device, provided the device is located in the detection field of the camera. In this regard, the supervision system according to the invention also comprises means for distinguishing whether the portable electrical device is in a state that is detectable visually or thermally or not detectable visually or thermally. As already mentioned above in relation to detecting the state of a passenger, image processing software is preferably involved here.

In the supervision system, in a first state, the power supply station provides power if the portable electrical device is in a state that is visually or thermally detectable. On the other hand, in a second state, the power supply station does not provide any power if the portable electrical device is in a state that is not detectable visually or thermally. Now if the passenger is in an inattentive state, the power supply station of the portable electrical device switches into its second state.

In a further aspect of the present invention, the proposed supervision system also works without using the thermal supervision of the portable electrical device; in this case, in a first state, the power supply station provides power, and in a second state, does not. In this variant of the supervision system according to the invention, the power supply station is in the second state if the passenger is in an inattentive state. This is achieved by intelligent software that uses image recognition and image analysis to differentiate between an attentive state and an inattentive state of a passenger.

In a further embodiment, in the proposed supervision system a means is also provided for providing information to cabin crew and/or even to the passenger that shows if a passenger is in an inattentive state, or if the portable electrical device is in a state that the camera cannot detect visually or thermally. Moreover, the information can also include the temperature of the portable electrical device, which temperature is detected by the camera.

These means for providing information to the cabin crew are preferably a display, on which is shown, for instance according to a seat position, whether a passenger is attentive, and/or the state ("in use"/"not in use") of his power supply station. Alternatively, it is also possible simply for a lamp specific to a seat-position to light up on the display (e.g., in different colors or at different time intervals), and thereby indicate that everything is fine or that there is a problem, for instance a rise in temperature of the PED. Within the meaning of the present application, the term "lamp" can also include a plurality of lamps, for instance an array of LEDs assigned to one seat position each.

In the supervision system, the camera is preferably integrated in a monitor, in particular in an in-flight entertainment (IFE) monitor. Such a monitor is usually located on, or in, the backrest ("backrest monitor") in front of the passenger having the portable electrical device under supervision.

The power supply station may be, for example, an outlet, or a wireless power supply apparatus, which allows what is known as contactless or wireless power transfer.

In the installed state, the supervision system according to the invention is located in an aircraft. In principle here, the display for the cabin crew may be not just at a fixed location, for instance on the galley or washroom wall. It is also conceivable that the information about the outlets that are in use or about a sudden temperature rise of a PED is transmitted additionally or solely to what is known as a wearable device of the crew.

The present invention also relates to a method for safe charging of portable electrical devices, comprising the steps of detecting a passenger by means of a camera, analyzing whether a passenger is in an attentive state or in an inattentive state, and, if the passenger is in an attentive state, supplying a power supply station with electrical power to be provided to a portable electrical device connected to the power supply station.

In addition, in a further variant according to the invention, the method can also comprise the following steps: detecting a portable electrical device by means of a camera; analyzing whether the portable electrical device is in a state that is visually or thermally detectable or in a state that is not visually or thermally detectable; and, if the portable electrical device is in a state that is visually or thermally detectable, supplying a power supply station with electrical power to be provided to a portable electrical device connected to the power supply station.

BRIEF DESCRIPTION OF THE DRAWINGS

The invention is now explained with reference to the following drawings, in which.

DETAILED DESCRIPTION OF THE PREFERRED EMBODIMENTS

Figure 1:
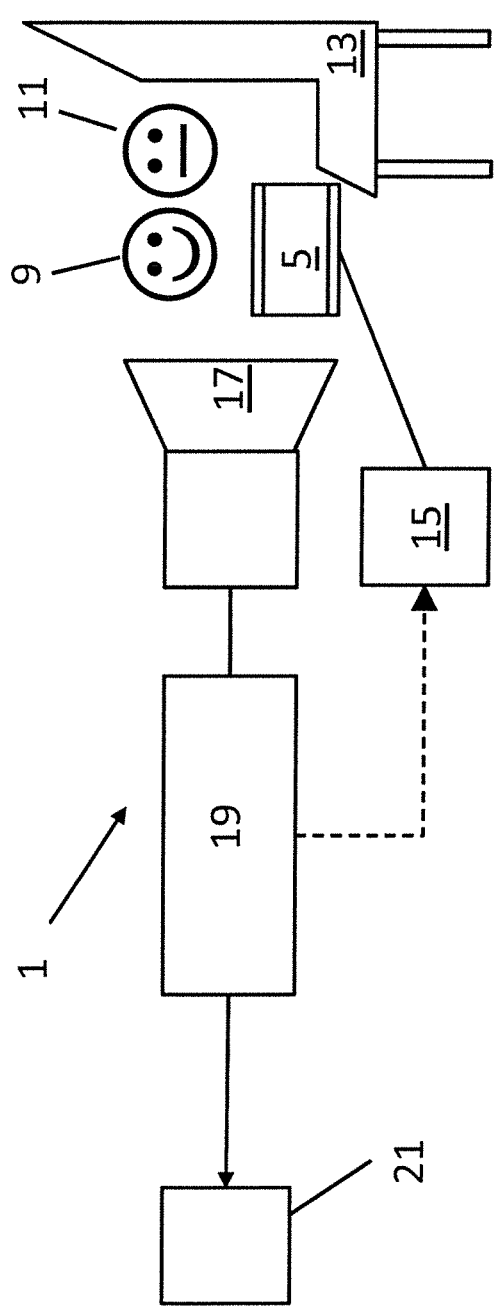
FIG. 1 shows schematically the supervision system according to the invention.

FIG. 1 shows schematically the supervision system 1 according to the invention for an aircraft 3 for monitoring the safe charging of portable electrical devices 5. In this figure, a passenger 7, who is in an attentive state 9 or in an inattentive state 11, is sitting on a seat 13. There is also a power supply station 15, which is assigned to the seat 13 and which can be used to supply a portable electrical device 5, in particular a PED, with electrical power. A camera 17 detects the state of a passenger 7 situated on the seat 13, and image processing software 19 is used to distinguish whether a passenger 7 is in an attentive 9 or inattentive state 11.

The PED or a different portable electrical device 5 is thus in a state that for the camera 17 is visually or thermally detectable or in a state that is not visually or thermally detectable. If the passenger 7 has placed his PED 5, for instance, such that it can be seen by the camera 17, i.e., is not concealed (e.g., under a blanket or in a pocket or the like), then the camera 17 acquires one or more images thereof. For example, this image may be from the standard visual frequency band or may be a thermal image. Suitable image processing software 19 can be used here to determine whether the portable electrical device 5 actually is in a state that is visually or thermally detectable. If this is the case, in a first state, the power supply station 15 provides power. The power supply station 15 does not provide any power ("second state"), however, if the portable electrical device 5 is in a state that is not detectable visually or thermally, and if, additionally, the passenger 7 is in an inattentive state 11. This provides an additional safeguard. Conversely, if the device 5 can be detected visually or thermally, the passenger 7 could also be in an inattentive state 11 and yet the outlet still be supplied with electricity. This may be the case, in particular, if the passenger 7 falls asleep or has left his seat position 13 briefly.

In addition, the supervision system 1 comprises means 21 for providing information to cabin crew as to whether or not an outlet is in use. Linked to the information as to whether the passenger 7 is attentive or inattentive, a decision can be made using the image processing software 19 to discontinue providing electricity for a particular passenger 7. The information may be provided, for instance, by a galley display 21 in an aircraft galley (or on/in another cabin monument) or, for example, by a flight attendant panel 21. Of course, technically there is no difference between providing this information to the crew or to the passenger 7. In particular, it would also be conceivable to notify the passenger 7 that the electricity supply for his PED 5 has been suspended, so that the passenger is aware that the device may not be fully charged yet, for instance, because he may have been asleep for a prolonged period.

The camera 17 of the proposed supervision system 1, in particular, may be concealed in an IFE monitor in a backrest of an aircraft seat 13. As already described earlier, the power supply station 15 is preferably an outlet, or a wireless power supply apparatus, which can be used for contactless power transfer.

Figure 2:
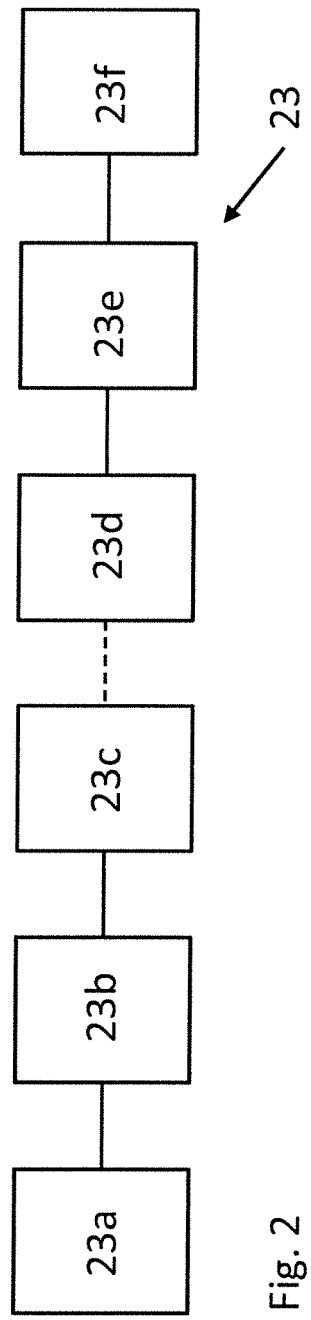
FIG. 2 shows schematically the method according to the invention for safe charging of portable electrical devices.

FIG. 2 shows schematically with the steps, the method 23 according to the invention for safe charging of portable electrical devices 5. In a first step 23a, initially a camera 17 is used to detect a passenger 7. This may be a standard image or a thermal acquisition. It is thereby possible to ascertain the state 9, 11 of a passenger 7. In a second step 23b, an analysis is performed to determine whether a passenger 7 is in an attentive state 9 or in an inattentive state 11. Depending on the result of this analysis, in a third step 23c, a power supply station 15 is then supplied with electrical power to be provided to a portable electrical device 5 connected to the power supply station 15, i.e., if the passenger 7 is in an attentive state 9.

Optionally, the method 23 can also comprise the following steps: detecting (step 4) 23d a portable electrical device 5 by means of a camera, and analyzing (step 5) 23e whether the portable electrical device 5 is in a state that is visually or thermally detectable or in a state that is not visually or thermally detectable. In a sixth step 23f, a power supply station 15 is then supplied with electrical power to be provided to a portable electrical device 5 connected to the power supply station 15, if the portable electrical device 5 is in a state that is visually or thermally detectable.

Figure 3:
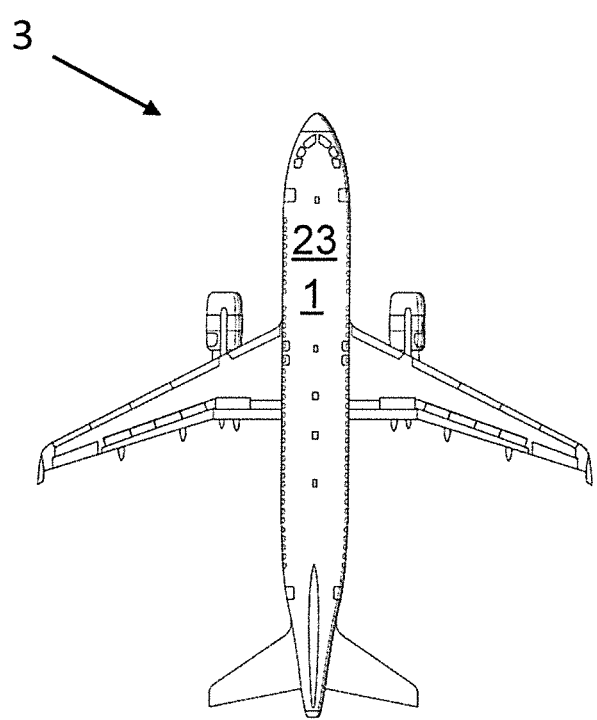
FIG. 3 shows an aircraft in which a supervision system according to the invention can be provided.

FIG. 3 shows an aircraft 3 which can comprise a supervision system 1 according to the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCES 1 supervision system
3 aircraft
5 portable electrical device
7 passenger
9 attentive state
11 inattentive state
13 seat
15 power supply station
17 camera
19 image processing software
21 means for providing information
23 method comprising the steps 23a-f

The invention claimed is:

1. A supervision system for an aircraft for monitoring the safe charging of a portable electrical device of a passenger comprising:
   a seat for a passenger;
   a power supply station, which is assigned to the seat and which is configured to supply a portable electrical device with electrical power;
   a portable electrical device connected to the power supply station;
   a camera for detecting the passenger situated on the seat and for detecting whether a state of the portable electrical device is a visually or thermally detectable state or a non-visually or non-thermally detectable state; and
   means for distinguishing whether a level of awareness of the passenger is an attentive level or an inattentive level,
   means for distinguishing whether the portable electrical device is in a state that is detectable visually or thermally or not detectable visually or thermally,
   wherein the power supply station has a first condition in which the power supply station is configured to provide power if the portable electrical device is in the state that is detectable visually or thermally, and
   wherein the power supply station has a second condition in which the power supply station is configured to not provide any power if the portable electrical device is in the state that is not detectable visually or thermally, and
   wherein the power supply station of the portable electrical device is in the second condition if the level of awareness of the passenger is at the inattentive level.

2. The supervision system as claimed in claim 1, also comprising means for providing information to cabin crew or to the passenger if the level of awareness of the passenger is at the inattentive level, or if the portable electrical device is in the state that is not detectable visually or thermally.

3. The supervision system as claimed in claim 2, wherein the means for providing information is a display or a lamp.

4. The supervision system as claimed in claim 1, wherein the camera is integrated in a monitor.

5. The supervision system as claimed in claim 4, wherein the monitor comprises an IFE monitor.

6. The supervision system as claimed in claim 1, wherein the distinguishing means comprise image processing software.

7. The supervision system as claimed in claim 1, wherein the power supply station is an outlet.

8. The supervision system as claimed in claim 1, wherein the power supply station is a wireless power supply apparatus.

9. An aircraft comprising a supervision system as claimed in claim 1.

* * * * *